No. 616,641. Patented Dec. 27, 1898.
C. STEINER.
LOW SPEED HIGH PRESSURE WATER TURBINE.
(Application filed Mar. 30, 1896. Renewed Oct. 8, 1898.)

(No Model.)

Witnesses:
John MacGregor
Horace K. Walker

Inventor:
Charles Steiner

UNITED STATES PATENT OFFICE.

CHARLES STEINER, OF ELMIRA, NEW YORK.

LOW-SPEED HIGH-PRESSURE WATER-TURBINE.

SPECIFICATION forming part of Letters Patent No. 616,641, dated December 27, 1898.

Application filed March 30, 1896. Renewed October 8, 1898. Serial No. 693,045. (No model.)

*To all whom it may concern:*

Be it known that I, CHARLES STEINER, a citizen of Switzerland, residing at Elmira, county of Chemung, State of New York, have invented a Low-Speed High-Pressure Water-Turbine; and I hereby declare that the following is a full, clear, and exact description of said invention.

The subject of this invention is a new kind of revolving hydraulic motor, especially for such cases where high pressure of the water is a condition and a comparatively small number of revolutions desirable.

The invention is illustrated by Figures 1, 2, 3, 4, and 5 of the drawings, similar letters indicating similar parts.

Figure 1:
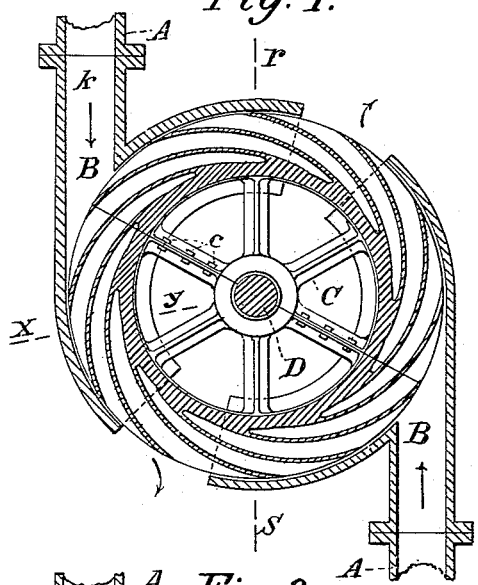
Figure 2:
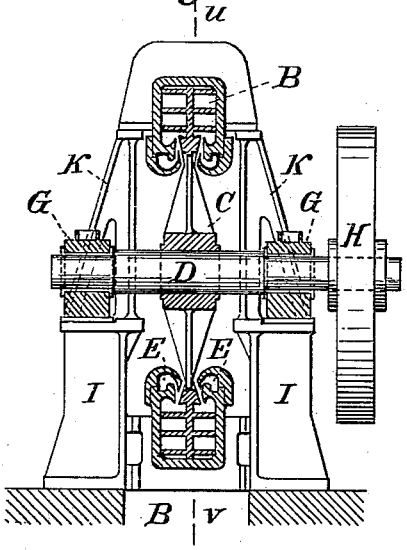
Figure 3:
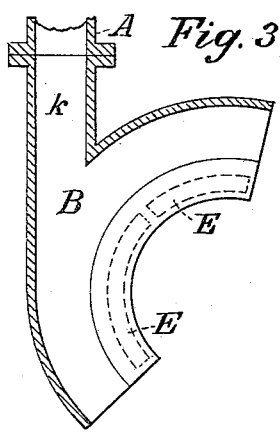
Figure 4:
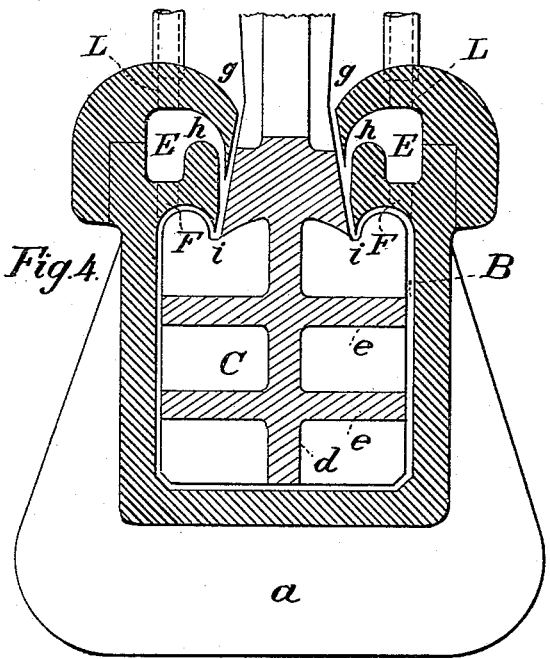
Figure 5:
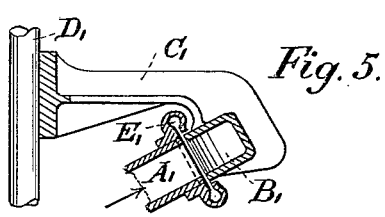

Fig. 1 shows a cross-section, on the line $u$ $v$ of Fig. 2, rectangular to the shaft of the turbine wheel. Fig. 2 is a section, on line $r$ $s$ of Fig. 1, through the center line of the shaft. Fig. 3 is a section of one passage-way alone, with pipe A and auxiliary canals E E shown by dotted lines, taken in the same plane as Fig. 1. Fig. 4 is a cross-section, on line $x$ $y$, Fig. 1, of the water passage-way in larger scale. Fig. 5 illustrates, in a half-section through center line of shaft, another arrangement of the essential parts for another motor on the same system, the inlet being nearly tangential, but from inside.

In Fig. 2 the turbine is shown with a horizontal shaft in order to illustrate the accessory parts by an example; but the shaft may also be arranged vertical or inclined.

A A, Fig. 1, are two pipes conveying the pressure-water to the turbine.

B B, Figs. 1 to 4, are two water passage-ways forming segments of rings and having exterior inlets $k$ for the water.

C is the turbine wheel, mostly composed of two half-wheels tied together by bolts $c$.

D is the turbine shaft.

F F and L L are apertures and pipes to convey pressure-water into E E.

G G in Fig. 2 are two bearings of the shaft, and H is a transmission-wheel.

I I and K K, Fig. 2, are supports.

The reinforcing-ribs and the supports are omitted in Figs. 1 and 3 for more clearness.

The circular portion of the water passage-way has throughout the same section (of such a shape as shown in Fig. 4 or otherwise) except at the inlet for the pressure-water. There is provided in the water passage-way, extending over its whole length, a wide slot $g$ $i$ $i$ $g$, through which the ring of the turbine wheel passes.

The paddles $e$ $e$ of the turbine wheel are turned with their convex side against the pressure. They may be reinforced by one or more ribs $d$ and are shaped so as to fit closely to the walls of the passage-way, still leaving sufficient interspace for an easy movement of the wheel.

In Fig. 5 similar parts, but with another arrangement, are indicated by same letters as above with an index 1. In this example the water passage-way B' is inside of the turbine wheel C', to which the paddles are fixed. The part A' closes this passage-way inside over its whole length, except at the inlet-hole of the water.

When started for work, the turbine of Figs. 1 to 4 acts as follows: The columns of water conveyed to the turbine through one, two, or more pipes A exert when admitted to the passage-way a tangential pressure on the turbine wheel, the central components being resisted by the bearings G G, but mostly counterbalanced by another inlet right opposite. The amount of the pressure at inlets can be regulated by an apparatus not belonging to this invention.

While the resistance is put on the transmission-wheel gradually, the turbine wheel will turn easily and assume a certain velocity, as desired, which is small compared with that corresponding to the free fall from the height of the water column. This velocity is, however, sufficient to impart to the water column a considerable momentum, which keeps it moving in the direction of the arrow. As the waterway is nearly shut off by the paddles, only a small portion of the water will pass the first paddle met with and fill up also the interspaces between the following paddles, losing its pressure from paddle to paddle until it reaches the outlet.

The work or resistance loaded on the turbine is to be taken so that for a certain pressure at disposition the velocity cannot increase more than desired, as the regulation of pressure above referred to, if used to a large extent, is always accompanied by loss of power.

In order to prevent the escape of water from the water passage-way through the interspaces $i\, g\, i\, g$, auxiliary canals E E are provided, to which pressure-water can be conveyed through conveniently-spaced apertures F F or L L either from the water passage-way B or directly from the pipe A. The water in the auxiliary canals E E may have the maximum pressure, as in pipe A, or somewhat smaller, and this pressure will always be sufficient to counterbalance and overcome the pressure from the main passage-way near the interspaces $g\, i\, g\, i$, where it is considerably reduced by the paddles. A continuous current must therefore take place from $h$ to $i$, which prevents the escape of water from the passage-way through the interspaces $i\, g$. By reducing the pressure in the auxiliary canals this current may be reduced nearly to zero, so that no appreciable interference with the efficiency of the motor will take place. As the passage-way has the same area of cross-section throughout and some water is added during the passage, it will be seen that in this turbine the water flows slightly quicker at the outlet than at the inlet. Having thus secured for a considerable head or fall a comparatively very small velocity of the wheel and a slightly-increased velocity of the water at the outlet without any considerable loss of water through interspaces nor any appreciable counteraction from the auxiliary canals, a good efficiency of the turbine must result whenever used under such conditions.

In the modified motor of Fig. 5 the principal difference is that the walls of the waterway are revolving instead of fixed. The action of this motor is, however, exactly the same as described for the arrangement of Figs. 1 to 4.

Having thus described my invention, I desire to secure by Letters Patent the following claims:

1. In a hydraulic motor the combination with a wheel, having peripheral paddles and a ring, from which said paddles extend, of a casing, segmental in form, partially surrounding and inclosing the said paddles to thereby form a channel, within which the water may exert its pressure on the traversing paddles and, in order to close the passage-way more completely, also provided with auxiliary canals, located in close proximity to the ring and having communication with the narrow interspaces between fixed and movable parts, the movable and fixed parts being out of contact at all times, substantially as and for the purpose described.

2. In a rotary, hydraulic motor the combination with the wheel of a segmental casing, partially surrounding said wheel and provided with auxiliary canals in communication with the interspaces between movable and fixed parts, the canals being located along said interspaces and being also in communication with the water-supply in order to furnish pressure-water from outside to any point of said interspaces.

CHARLES STEINER.

Witnesses:
JOHN MacGREGOR,
HORACE K. WALKER.